United States Patent [19]

Williams

[11]  4,209,535
[45]  Jun. 24, 1980

[54] KOJI PROCESS FOR PRODUCING SOY SAUCE

[75] Inventor: Wilmore Williams, Wheaton, Ill.

[73] Assignee: Beatrice Foods Co., Chicago, Ill.

[21] Appl. No.: 964,278

[22] Filed: Nov. 28, 1978

[51] Int. Cl.$^2$ ............................ A23L 1/23; A23L 1/238
[52] U.S. Cl. ........................................... 426/46; 426/52
[58] Field of Search ...................... 426/46, 52, 18, 20; 195/128, 129; 435/290, 302, 313

[56] References Cited

U.S. PATENT DOCUMENTS

| | | | |
|---|---|---|---|
| 3,647,484 | 3/1972 | Yokotsuka et al. | 426/46 |
| 3,830,939 | 8/1974 | Sakasai et al. | 426/46 |
| 4,008,333 | 2/1977 | Izumi | 426/46 |
| 4,028,470 | 6/1977 | Hayashi et al. | 426/46 |
| 4,048,340 | 9/1977 | Izumi | 426/46 |
| 4,115,591 | 9/1978 | Noda et al. | 426/46 |

Primary Examiner—R. B. Penland
Attorney, Agent, or Firm—Murray and Whisenhunt

[57] ABSTRACT

In the method of producing koji for use in making soy sauce wherein a koji culture is grown on a koji mixture containing soy beans and cereal grain, an improvement is provided comprising providing a koji mixture with 18% to 40% moisture; inoculating the mixture with koji culture; forming a bed of the mixture to a depth of 8 to 50 inches in a receptacle having a perforated bottom, airflow means communicating with the perforated bottom for forcing room air through the bottom and through the receptacle, temperature sensing means in the bed and actuating means for actuating the airflow means in response to the temperature sensing means; controlling the room air between 5° C. and 38° C. and the relative humidity above at least 50%; controlling the temperature of the bed within the range of 15° C. to 42° C. by actuating the airflow means in response to the temperature sensing means whereby room air is flowed through the bed; and continuing the growth of koji culture in the bed for 2 to 10 days without disturbing the bed.

11 Claims, 3 Drawing Figures

KOJI PROCESS FOR PRODUCING SOY SAUCE

The present invention relates to a method for producing koji for use in making soy sauce, and particularly, to such koji which does not contain foreign additives or other ingredients beyond those ingredients used in traditional koji and wherein the koji mixture for making the koji can not only use the conventional soy beans but also the advantageous soy grits. It further relates to a process wherein the amount of koji culture grown during the koji process is increased, and wherein the space, labor and control required in making the koji is substantially less than that required by conventional processes.

BACKGROUND OF THE INVENTION

Soy sauce is made by first producing koji, which is mixed with salted water to produce moromi. The moromi is fermented for up to a year or more, and the liquid is expressed from the fermented batch to product the liquid soy sauce. This process is well known and has been practiced for centuries. A critical step in the process is that of producing the koji. Koji is conventionally produced by inoculating a combination of soy beans and cereal grains with a koji culture, and allowing that culture to grow on the koji mixture for time sufficient to provide a substantial koji culture growth.

The koji culture can vary in its contents of specific organisms, and indeed, the culture may be taken from a previous koji production. Irrespective of the particular koji culture, the culture is a mold, and its growth rate is sensitive both to temperature and the moisture content of the koji mixture (the substrate). Thus, if the temperature of the substrate is below about 15° C., or above about 42° C., or if the moisture content of the substrate is below about 13%, the mold will essentially cease to grow. Further, oxygen is consumed in the mold growth, and it is critical that adequate oxygen levels always be maintained, or otherwise the mold growth will be considerably slowed.

It is important to maximize mold growth in the shortest possible time since it is this mold which produces the enzyme that is ultimately responsible for producing the soy sauce flavor. Accordingly, in the traditional process of producing koji, the koji mixture of soy beans and cereal grain is inoculated with the koji culture, and the inoculated mixture is plced on open trays with a bed depth usually not exceeding two inches. Often, the trays are also perforated trays in order to increase the airflow around the inoculated koji mixture. During mold growth, the inoculated koji mixture is agitated, e.g. stirred by hand, both to provide additional oxygen and to lower the temperature of the inoculated mixture. As the mold grows, heat is generated and in substantial bed depths internal temperatures can exceed 45° C. and stop all mold growth. This is, of course, a laborious and time-consuming process.

The mold growth is optimized when the koji mixture (the substrate) has a moisture content between about 20% and 40%, optimally just under about 30%, e.g. 27 to 29%. On the other hand, at moisture contents of about 42% or greater, the water activity of the substrate is sufficient to produce bacterial growth, which will sour the koji mixture and spoil that mixture for producing soy sauce. Thus, there is a practical upper limit on the amount of moisture which can be contained in the koji mixture. This moisture limit, however, results in other practical problems. Thus, as the inoculated koji mixture remains on open trays and is stirred or otherwise agitated during the mold growth, the moisture content of the koji mixture continues to decrease and may easily reach moisture contents out of the optimum growth range. Also, in extreme cases, the moisture content may drop so low that mold growth essentially ceases.

As can therefore be appreciated, the traditional process for making koji is really a compromise between competing factors. The bed depth of koji mixture must be kept shallow in order to avoid heat build-up during mold growth and to supply oxygen for mold growth. However, the shallow bed depth and the frequent stirring required increases the rate in which moisture is removed from the koji mixture. In addition, this compromise requires considerable space and labor.

The art has sought to overcome these difficulties in producing koji, and many suggestions in this regard have been made. Thus, the use of bactericides have been suggested in order to avoid bacterial growth and spoilage at higher moisture contents. The use of citric acid and tartaric acid have been suggested in this regard. Also modifying the koji substrate with ammonium acetate and lower alcohols have been suggested. Similarly, it has been suggested to use a calcium salt or a magneseum salt in combination with steaming of the substrate. Sulphite salts and sulfurous acid have also been suggested, even including antibiotics.

However, all of these additives change the flavor of the resulting soy sauce, and the flavor is not that of the true traditional soy sauce without those additives.

In order to avoid flavor degeneration, it has been suggested that the soy beans can be steamed in a very precise manner prior to inoculation, whereby moisture contents of 30 to 70% are achieved. It is said that the critical steaming, as opposed to the usual pressure cooking and/or steaming, causes some denaturization of the protein, but here again, the difficulties with souring of the koji are not mitigated (see U.S. Pat. No. 3,647,484).

In another approach, U.S. Pat. No. 4,048,340 suggests a fairly complex "closed" koji system comprising a koji chamber for carrying circulating gas, into which steam is injected. A series of cyclones remove dust and other impurities from the circulating gas blown through the chamber by continuously running fans. A bypass in parallel with the chamber allows the circulating gas to bypass the chamber in response to temperature sensing devices located externally of the koji making chamber near the entrance and exit ports of the chamber. Thus, the amount of circulating gas which passes through the chamber is adjusted according to the desired temperature and humidity. However, as pointed out in that patent, closed systems are very susceptible to accumulating contaminating bacteria, with resulting spoilage of the koji.

As is well known whole soy beans, which contain oil, protein, carbohydrates and fiber are not efficient for producing soy sauce and have disadvantages. Essentially only the protein and carbohydrate are used in the mold growth, and especially the protein. The remaining fiber and oil not only constitute unneeded bulk which must be handled, but create an increased disposal problem. Further, the soybean oil is a wanted product which can not be recovered from the spent beans, and in some cases the contaminating oil can become rancid and given an unacceptable off-taste.

For these reasons, the art has long recognized that the defatted beans (in the form of dry soy "grits") would be an advantageous substitute for whole soy beans in producing koji. Thus, for any improved process for making koji to be substantially commercially advantageous over the conventional process, the improved process must be capable of using both whole soy beans and soy grits. This necessity of using both whole soy beans and soy grits is due to varying supplies of both and the need to interchangeable use either one or the other without substantial changes in the koji making process.

The desirability of using soy grits has compounded the problems, discussed above, in connection with whole soy beans. When soy grits are substituted for soy beans, the higher bulk density of the soy grits substantially decreases the natural air flow through the open trays and the soy grits can easily exceed the maximum temperature of 42° C. during mold growth. Further, oxygen levels with the bed of soy grits can decrease to where the rate of mold growth is is substantially decreased. Thus, when soy grits are used in the conventional method of producing koji, the soy grits must either be stirred more often, which compounds the problems discussed above, or the bed depth must be substantially decreased, which not only decrease the production of the koji but increases the problem of rapid moisture removal and consequential decrease in mold growth. Accordingly, the use of soy grits has not been as commercially attractive as desired, and the unability to effectively handle both whole soy beans and soy grits has made prior proposals for improved koji production unsatisfactory.

It will therefore be appreciated that it would be of considerable advantage to the art to provide a method for producing koji which does not suffer from the above-noted disadvantages, particularly in regard to spoilage by bacterial fermentation, time-consuming and laborious stirring, the requirement for substantial space for the shallow bed trays, and the inability to use both whole soy beans and soy grits.

OBJECTS OF THE INVENTION

It is therefore an object of the invention to provide a process wherein the space required for producing a unit amount of koji is substantially reduced. It is a further object of the invention to provide a process wherein the moisture content can be maintained in the koji mixture so that optimum mold growth can occur. It is another object of the invention to provide adequate oxygen and temperature control during the mold growth period, while at the same time maintaining optimum moisture content of the koji mixture. It is a further object of the invention to avoid the necessity of handling the koji mixture during mold growth, i.e., to avoid the necessity of stirring and the like. It is further object of the invention to provide a process wherein little or no maintenance is required, and the finished koji may be easily recovered from the process. Finally, and most importantly, it is an object of the invention to provide a process which may use either soy beans or soy grits. Other objects will be apparent from the following disclosure and claims.

BRIEF DESCRIPTION OF THE INVENTION

Figure 1:
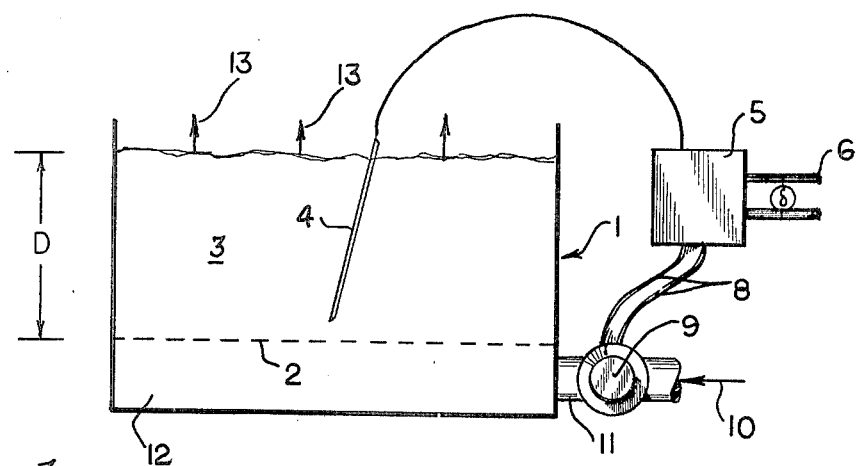
FIG. 1 is a schematic side view of a receptacle, with associated apparatus, for carrying out the process of the present invention.

The invention is based on several primary discoveries. First of all, it has been discovered that the loss of moisture from the koji mixture to ambient air is substantially less when the koji mixture is maintained in a bed of substantial depth, as opposed to the shallow bed depths of the traditional process. Thus, in these greater bed depths, the moisture content of the koji mixture can be maintained at those levels which are optimum for mold growth. Apparently, this is a result of the very low ratio of bed surface area to bed volume in the present invention, as opposed to the very high ratio of bed surface area to bed volume in the traditional method of producing koji.

Secondly, it has been discovered that in these greater bed depths the temperature rise with mold growth is much greater than in the shallow beds. Hence, it has been discovered that in the greater bed depths, it is necessary to provide forced cooling of the greater bed depth by forcing room air through the bed. This also serves to keep the oxygen level within the bed at optimum conditions. In this regard, it has been discovered that the increasing bed temperature reflects the decreasing oxygen level and by maintaining the bed temperature within certain ranges, the oxygen level is automatically kept within adequate ranges for optimum mold growth.

Thirdly, it has been discovered that in order to maintain the higher moisture content of the koji mixture, the cooling of the bed with the air must be done only when required by temperature rise. Hence, it is necessary to provide means for flowing air through the bed in response to the temperature rise, and, correspondingly, means for stopping that flow of air when the temperature within the bed drops to the desired level. This avoids undue removal of moisture from the koji mixture and maintains the moisture level in the range for optimum mold growth.

With this method, no additives to the conventional koji mixture are required. Neither are any special steaming or cooking conditions required, although they may be used if desired.

Also, the method can be operated in an open system, so that accumulating contaminating organisms is not a problem, such as the problem associated with closed systems.

With the present process, the greater bed depths greatly increase the aount of koji mixture which can be processed in a given volume of space. No handling is required during the mold growth process, e.g., no stirring or the like, and the apparatus for carrying out the process is simple and easy to maintain. Also, in view of the greater bed depths and the lack of handling during the mold growth period, the amount of mold dust in the ambient space is minimized, as opposed to the amount of mold dust in the ambient space ocassioned by the traditional process.

Fourthly, and importantly, it has been discovered that soy grits may be used in the above described process when the initial moisture content of the koji mixture is kept at a lower value than the desirable maximum value, i.e., 40%, and when the bed depth is less than the maximum desired bed depth for the soy beans. Apparently, when the moisture content of the soy grits exceeds about 38%, compaction of the soy grits markedly increases, with a corresponding decrease in air flow and increase in temperature. However, it has also been discovered that with the present substantially greater bed depths, the moisture content of the soy grits can nevertheless be maintained within the optimum range for mold growth. These are surprising and unexpected discoveries that allow the present process to be most commercially attractive, as explained above.

Thus, broadly stated, the invention provides in a method of producing koji for use in making soy sauce wherein a koji culture is grown on a koji mixture containing soy beans and/or soy grits and cereal grains, the improvement comprising (i) providing a koji mixture with an overall moisture content of between about 18% and 40%, (ii) inoculating the koji mixture with koji culture, (iii) forming a bed of the inoculated koji mixture to a bed depth of 8 to 50 inches in a receptacle having a perforated bottom, airflow means communicating with said perforated bottom for forcing room air through the said bottom and through said receptacle, temperature sensing means disposed within the said bed of inoculated koji material, and actuating means for actuating said airflow means in response to said temperature sensing means, (iv) controlling the room air between 5° C. and 38° C. and the relative humidity at least 50%, (v) controlling the temperature of the said bed of inoculated koji mixture within the range of 15° C. to 42° C. by actuating said air-flow means in response to the temperature sensing means, whereby room air is flowed through the perforated bottom and therefore through the bed of inoculated koji mixture, and (vi) continuing the growth of the koji culture in the bed of inoculated koji material for two to ten days without disturbing the bed of inoculated koji mixture.

DETAILED DESCRIPTION OF THE INVENTION

The koji mixture may be any of the traditional mixtures known to the art. Thus it can be any combination of soy beans or soy grits and cereal grains. The soy beans or soy grits may be pretreated in any of the traditional manners, including cooking, soaking or steaming. The steaming can be at atmospheric pressure or super atmospheric pressure, e.g., up to 15 psi. Part of the beans may be roasted and/or cracked beans. The cereal grain is normally roasted, although it may be prepared in the same manner as noted above if desired. However, by way of example, the soy beans are usually mixtures consisting of 50% boiled beans and 50% roasted beans. The boiled beans are usually prepared by soaking in water for about 2 to 8 hours and then cooking in water at a low temperature, usually 75° C. to 125° C. for one to two hours. The roasted beans are prepared by placing the beans in an oven, for example a conventional gas fired rotating oven, and roasting at a temperature of about 125° C. to 135° C. for about one to two hours, or until the soy beans are brown and brittle. Since soy beans are dicothylendons, i.e., they have two halves, they tend to crack and split into halves during the roasting process. Alternatively, the roasted beans may be subjected to mechanical pressure to further crack the beans into quarters or less to increase the surface area of the roasted beans. The soy grits may be treated in a similar manner, but it is only necessary to mix the dry soy grits (or the entire koji mixture containing the grits) with water until a homogeneous moisture content is achieved. This is referred to as "soaking" herein. The cereal grain component, e.g., wheat, is roasted in a similar manner until brown and brittle, and again, the wheat may be cracked by mechanical means.

Irrespective of the particular grain cereal, the method of pretreating the grain cereal, and the method of pretreating the soy beans or grits, provisions must be made so that the total koji mixture has an overall moisture content of about between 18% and 40%. This may be achieved, for example, when cooked or soaked soy beans are used in the koji mixture. On the other hand, when dry soy grits are used, then water may be added to the dry soy grits or to the koji mixture to provide the moisture content. This may be by simple mixing (soaking) of the grits or mixture. However, as explained above, when soy grits entirely replace the soy beans, the moisture content should not exceed 38%.

Once the koji mixture has been allowed to come to an equilibrium moisture content of between about 18% and 40% (38% in the case of using soy grits in lieu of soy beans), the mixture is ready for inoculation. Any of the conventional koji inoculants may be used. By way of example, typical koji inoculants are *Aspergilus oryzae* and *Aspergilus sojae*. Usually, from 0.001% to 10% of koji culture, based on the weight of the koji mixture, is used for inoculation purposes, although amounts outside of this range may be used if desired.

The inoculated koji mixture is then placed in a suitable receptacle for carrying out the process for mold growth. As can best be understood from the drawings, and referring particularly to FIG. 1, the apparatus consists of a receptacle 1 having a perforated bottom 2 for containing the bed 3 of the koji mixture. That bed has a depth D. Disposed within bed 3 is a temperature sensing device 4, which is conveniently a thermocouple, although other devices, e.g., gas filled tubes and the like, may be used. The sensing device 4 is connected to an actuating means 5, which means is appropriate for the particular sensing device employed. For example, when the sensing device is a thermocouple, a corresponding thermocouple relay is used. If the sensing device is a gas filled tube, then a corresponding pressure relay is used. The actuating means cuts on and off the power supply 6 for feeding power through lines 8 to airflow means 9. The airflow means may be any convenient mechanical or pneumatic means for pressurizing an airflow from ambient air, shown by arrow 10, through duct 11 and into a plenum 12 from which air is distributed to the bed. Conveniently, the airflow means is a fan, e.g., centrifugal fan, for forcing air through the bed 3.

Figure 2:
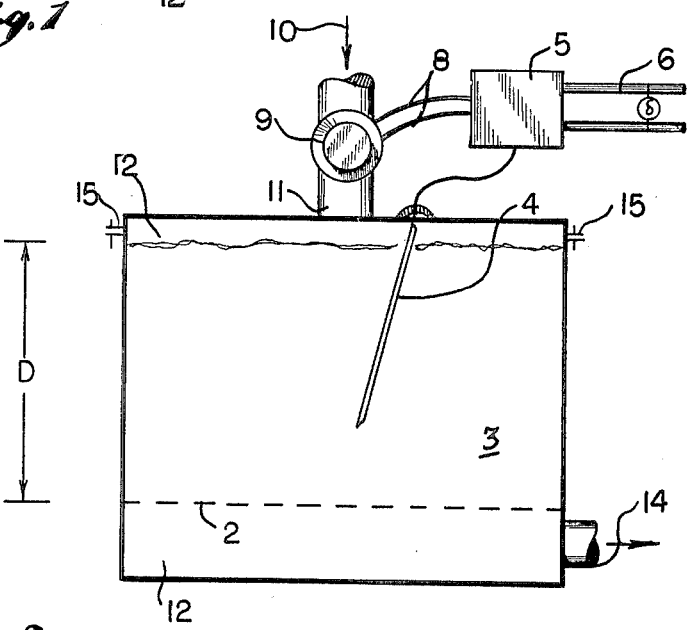
FIG. 2 shows an additional embodiment of FIG. 1.
Figure 3:
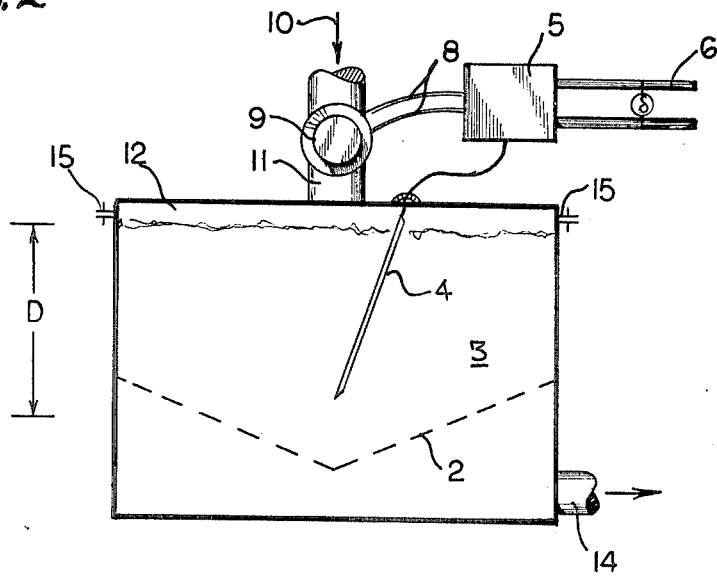
FIG. 3 shows a further embodiment of FIG. 2.

FIGS. 1, 2, and 3 illustrate three embodiments of the apparatus described above. As can be seen, the embodiment of FIG. 1 has an open top and air 10 is passed through airflow means 9 into plenum 12, through perforated bottom 2, up through bed 3, and exits the top of the bed as shown by arrows 13.

In FIG. 2, air 10 passes through airflow means 9, duct 11, plenum 12 and downwardly through bed 3. That air exits perforated bottom 2 and passes via plenum 12 through exit duct 14.

The same arrangement is used in FIG. 3, and the difference is that the perforated bottom 2 is conical in section. This embodiment simply illustrates that the perforated bottom can be in various configurations, aside from the flat bottom illustrated in FIGS. 1 and 2. Thus, it can be conical as illustrated in FIG. 3, but alternatively, it could be basket-shaped, i.e., with perforated sidewalls, as well as a perforated bottom, or the bottom may have an inverted conical shape opposite in orientation to that shown in FIG. 3.

As will be easily appreciated, in operation of the device, after the koji mixture has been moisturized, it is inoculated with the koji culture and the inoculated koji mixture is formed into a bed of inoculated koji mixture to a bed dept of D (average D in the case of other than flat bottom receptacles). With the present invention, that bed depth can be up to 50 inches, (127 cm.) i.e., an order of magnitude greater than bed depths used in the conventional koji process. The bed depth will normally be at least 8 inches, (20 cm.) but at this bed depth, the process is less economical and unwanted moisture removal can occur in some cases. At the higher bed depths of about 50 inches the airflow is so decreased that in some cases the temperatures of about 42° C. can be encountered. Thus, preferably, the bed depth will be between 15 and 40 inches (38–101 cm.). The depth will vary with the particular material. Thus, if whole beans and wheat are used, then greater bed depths can be used, i.e., up to near 50 inches. On the other extreme, if soy grits and wheat are used, then the bed depth should not exceed 36 inches (92 cm.), but preferably at least 18 inches, since the compaction of the soy grits increases the resistance to airflow, and the greater bed depths decrease the airflow to a point where sufficient airflow is not achieved and unacceptable temperatures rises may be encountered.

Since the airflow means communicates with the perforated bottom, directly in the case of FIG. 1, and via the bed in FIGS. 2 and 3, the airflow means will cause room air to be forced through the bottom and, consequently, through the receptacle. The temperature sensing means is disposed within the bed of inoculated koji mixture and, hence, senses the temperature thereof. When the temperature reaches a set point, it causes actuation of the actuating means for actuating the airflow means in response to the temperature sensed by the temperature sensing means. This passes current to the airflow means and causes operation thereof. Air is, consequently, flowed through the bed and causes cooling of the bed. When the bed is cooled below the set point, the actuating means interrupts the current and discontinues operation of the airflow means. The details of such apparatus are well known in the art and will not be described herein for the sake of conciseness.

As noted above, in carrying out the process, the temperature of the bed of inoculated koji mixture must be controlled within the range of 15° C. to 42° C., i.e., by actuating the airflow means in response to the temperature sensing means. As room air if flowed through the perforated bottom and through the bed of inoculated koji mixture, the bed is cooled only if the room air is maintained at a temperature below the maximum temperature desired in the bed. Thus, the room air should be controlled at a temperature of about between about 5° C. and 38° C. Further, since the room air passing through the bed has a tendency to dehydrate the beans, it is important that the air being passed through the bed be humidified in order to mitigate that dehydration tendency. Thus, the room air relative humidity should be at least 50%, more preferably at least 70%, and up to 95%. This upper humidity limit is for the purpose of avoiding condensation on the beans. Local condensation can provide areas of local high moisture with, correspondingly, bacterial growth.

The growth of the koji culture in the bed of inoculated koji mixture is continued for 2 to 2.5 days to ten days in order to achieve optimum mold growth. Normally, however, that growth will be accomplished in less than six days, but usually more than three days. Most often the growth is accomplished in 3 to 5 days. It will be appreciated that continuing the growth past these optimum periods will not harm the koji, but little mold growth is achieved after reaching the optimum growth.

In bed depths within the range described above, there is a substantial "lag" period during which little mold growth takes place. Once the inoculated koji mixture is formed into a bed in the receptacle, mold growth will commence, but the growth rate is very low. After approximately 2 days, the lag period is passed, and an extremely rapid growth period takes place. This is referred to as the logrithmic growth period. During the lag period, there is little demand for either cooling or additional oxygen supply since there is relatively low growth of mold. Accordingly, and a preferred embodiment, there is no flow of air through the bed until after the lag period of the koji culture has passed and the logrithmic growth period of the koji culture begins. This avoids any unnecessary dehydration of the koji mixture due to a flow of air through the bed in this lag period.

There is no requirement for moisture being added during the process and indeed, the addition of moisture can be disadvantageous since local high moisture contents within the bed can promote bacterial growth. Actually, as the process continues, the moisture content of the koji mixture decreases. However, it has been found that by virtue of the greater bed depths and the control of airflow through the bed that moisture is conserved and the initial moisture content is sufficient to keep the moisture content of the bed in the optimum moisture content ranges during the entire growth period. This is an important advantage of the present invention. By this method, the moisture content of the koji mixture decreases during the process but the moisture content does not drop below the 18% moisture level where mold growth is decreased. Indeed, with the present process the moisture content of the koji mixture at the beginning of the logrithmic growth period is at least 25%, which is within the range of optimum mold growth.

Accordingly, it can be further appreciated that the invention has the decided advantage that during the entire growth period the bed of inoculated koji mixture is not disturbed. In other words, there is no necessity of handling, stirring or otherwise disturbing the bed of koji mixture. This results in less maintenance and easier harvesting with a minimumization of accumulated mold dust due to excessive handling of the koji mixture. Also, as can be appreciated, the greater bed depths give a high ratio of koji mixture to room space. The room itself need not be of any special construction, as with closed systems, other than well known provisions must be made for heating and humidifying the room. In this regard, any of the electric, oil or gas heat systems are acceptable, and humidification can simply be by steam sparging or evaporation pads, all of which are known in the art and will not be described herein for the sake of conciseness.

It will be appreciated, however, that the use of room air, in the present process, has an important advantage over the "closed" system of U.S. Pat. No. 4,048,340, discussed above. Since by natural infiltration room air within a room is changed about every two hours, no substantial accumulation of unwanted bacteria will occur in the room air. Further, since room floors, and even walls, can easily be washed down, with or without the use of microbicides, bacteria will not substantially accumulate in the room. Also, when the present receptacles are cleansed with or without microbicides after each use (which may be easily performed), there will be no accumulation of bacteria in the receptacles. Thus, the inevitable accumulation of unwanted bacteria in the "closed" system is avoided with the present invention.

Once the koji has been produced, it is emptied from the bin by inverting the bins (in the case of FIG. 1) or by removing the top of the bins (in the case of FIGS. 2 and 3). In this latter regard, any means of closing the top to the bottom may be used as desired. Schematically indicated in FIGS. 2 and 3 are lip clamps 15.

It will also be appreciated that the orientation of the receptacles in FIGS. 1-3 are not cirtical. For example, if desired, the receptacles could have perforated sides, rather than a perforated bottom and, of course, the airflow means would communicate through the perforated sides.

The following Example will illustrate the invention, but it is to be understood that the invention is not limited thereto but extends to the scope of the foregoing specification. In the Examples, as well as in the specification and claims, all percentages and parts are by weight unless otherwise indicated.

Example 1

300 pounds of soy beans were soaked in water for 2 hours, drained and cooked in water at 10 psig for 45 minutes. The beans were cooled, drained and placed into a mixer. An equal weight of roasted beans was added. The roasting is in a conventional gas fired roaster operated at about 400° F. 600 pounds of roasted wheat are also added. The wheat is roasted in the same manner as the beans. Blending in the mixture is continued until a uniform koji mixture is obtained. 10 grams of concentrated *Aspergilus oxyzae* spores are added with mixing to the koji mixture.

The inoculated koji mixture is then placed in a bin which is mechanically equivalent to that of FIG. 1. The thermocouple is inserted into the mddle of the bed, which bed has a depth of 33 inches. The bed is left undisturbed, and the automatic temperature control keep the bed temperature at approximately 28° C. The fan does not run until at least 18 hours, i.e., the lag period has passed and the logrithmic period has begun.

After 4 days, the bin is emptied by inverting the bin and used in the conventional soy sauce process to produce an oriental-style soy sauce. The flavor and aroma are the same as the soy sauce produced by the traditional process.

EXAMPLE 2

The procedure of Example 1 was repeated except that the entire soy bean ingredients (boiled and roasted) were replaced by roasted soy grits (roasted in essentially the same manner as described above). The grits and wheat were moisturized in the mixer by adding water thereto until a moisture content of 30% is reached. The bed depth in the bin was 30 inches.

The soy sauce produced was equivalent to Example 1.

It will be appreciated that various modifications of the described process will be readily apparent to those skilled in the art. Thus, for example, the room air may be drawn through the koji bed by the airflow means being in duct 11. Alternatively, the walls of the receptacle may contain the perforated "bottom" and the plenum or the perforated "bottom" and plenum may be concentrically disposed with the bed therein between. The claims are to be so construed and limited only by the spirit and scope thereof.

What is claimed is:

1. In a method of producing koji for use in making soy sauce wherein a koji culture is grown on a koji mixture containing soy beans and cereal grain, the improvement comprising:
   (1) providing a koji mixture with an overall moisture content of between about 18% and 40%;
   (2) inoculating the koji mixture with koji culture;
   (3) forming a bed of the inoculated koji mixture to a bed depth of 8 to 50 inches in a receptacle having a perforated bottom, airflow means for communicating with said perforated bottom for forcing room air through the said bottom and through said receptacle, temperature sensing means disposed within the said bed of inoculated koji mixture, and actuating means for actuating said airflow means in response to said temperature sensing means;
   (4) controlling the room air between about 5° C. and 38° C. and the relative humidity above at least 50%.
   (5) controlling the temperature of the said bed of inoculated koji mixture within the range of 15° C. to 42° C. by actuating said airflow means in response to the temperature sensing means whereby room air is flowed through the perforated bottom and through the bed of inoculated koji mixture; and
   (6) continuing the growth of koji culture in the bed of inoculated koji mixture for 2 to 10 days without disturbing the bed of koji mixture.

2. The method of claim 1, wherein no room air is flowed through the said bed until after a lag period of the koji culture has passed and a logrithmic growth period of the koji culture begins.

3. The method of claim 1, wherein no moisture is added during the said process.

4. The method of claim 3, wherein the moisture content of the koji mixture decreases during the said process but the moisture content does not drop below 20%.

5. The method of claim 4, wherein the moisture content of the koji mixture at the beginning of the logrithmic growth period is at least 25%.

6. The process of claim 1, wherein the said bed depth is 8 to 40 inches.

7. The process of claim 6, wherein the koji mixture contains cooked soy beans and roasted wheat.

8. The process of claim 1, wherein the said bed depth is 8 to 36 inches.

9. The process of claim 8, wherein the koji mixture contains soy grits and roasted wheat.

10. The process of claim 1, wherein the moisture content of the koji mixture is achieved by treating at least one of the ingredients of the koji mixture by at least one step of cooking, soaking or steaming.

11. The process of claim 10, wherein the treated ingredient is the soy beans.

* * * * *